United States Patent
Nakatani et al.

(10) Patent No.: US 6,895,828 B2
(45) Date of Patent: May 24, 2005

(54) TORQUE SENSOR AND METHOD OF MANUFACTURING TORQUE SENSOR

(75) Inventors: Norio Nakatani, Mie (JP); Takahiro Sanada, Nara (JP); Terukazu Nakajima, Nara (JP); Masayuki Yamamoto, Tokyo (JP); Naoki Fukui, Tokyo (JP)

(73) Assignees: Koyo Seiko Co., Ltd., Osaka (JP); Finesinter Co., Ltd., Tokyo (JP)

( * ) Notice: Subject to any disclaimer, the term of this patent is extended or adjusted under 35 U.S.C. 154(b) by 0 days.

(21) Appl. No.: 10/715,389

(22) Filed: Nov. 19, 2003

(65) Prior Publication Data

US 2004/0144184 A1 Jul. 29, 2004

(30) Foreign Application Priority Data

Nov. 20, 2002 (JP) ..................... P.2002-336567

(51) Int. Cl.[7] .............................. G01L 3/02
(52) U.S. Cl. ................................ 73/862.331
(58) Field of Search .............. 73/862.331, 862.332, 73/862.333, 862.334, 862.335, 862.336

(56) References Cited

U.S. PATENT DOCUMENTS

| | | | |
|---|---|---|---|
| 4,907,460 A | 3/1990 | Taniguchi et al. | |
| 4,996,890 A | * 3/1991 | Taniguchi et al. | ..... 73/862.331 |
| 6,301,975 B1 | * 10/2001 | Chikaraishi | ............ 73/862.331 |
| 6,318,188 B1 | * 11/2001 | Yasui et al. | ............ 73/862.333 |
| 2002/0157481 A1 | 10/2002 | Kogiso et al. | |

FOREIGN PATENT DOCUMENTS

| | | |
|---|---|---|
| EP | 0 362 890 A2 | 4/1990 |
| JP | 3-48740 | 5/1991 |
| JP | 11-51789 | 2/1999 |

* cited by examiner

*Primary Examiner*—Edward Lefkowitz
*Assistant Examiner*—Takisha Miller
(74) *Attorney, Agent, or Firm*—McGinn & Gibb, PLLC (57) ABSTRACT

A magnetic first detecting cylinder covers a magnetism leakage preventing member covering a first shaft. A second detecting cylinder is rotated along with a second shaft connected to the first shaft and one end thereof is opposed to one end of the first detecting cylinder with a clearance. A reluctance with respect to a passing magnetic flux in a first magnetic circuit constituted by generating the magnetic flux passing the first detecting cylinder and the second detecting cylinder by a first coil, is changed in accordance with an elastic relative rotational amount by a change in a transmitting torque of the two shafts. The magnetism leakage preventing member is molded from a synthetic resin material injected into a molding die. The first shaft and the first detecting cylinder are integrated to the magnetism leakage preventing member molded by being inserted into the molding die before injecting the synthetic resin material.

12 Claims, 10 Drawing Sheets

TORQUE SENSOR AND METHOD OF MANUFACTURING TORQUE SENSOR

BACKGROUND OF THE INVENTION

The present invention relates to a torque sensor used for detecting a steering torque in a power steering apparatus for exerting a steering assisting force in accordance with, for example, the steering torque, and a method of manufacturing the torque sensor.

Figure 10:
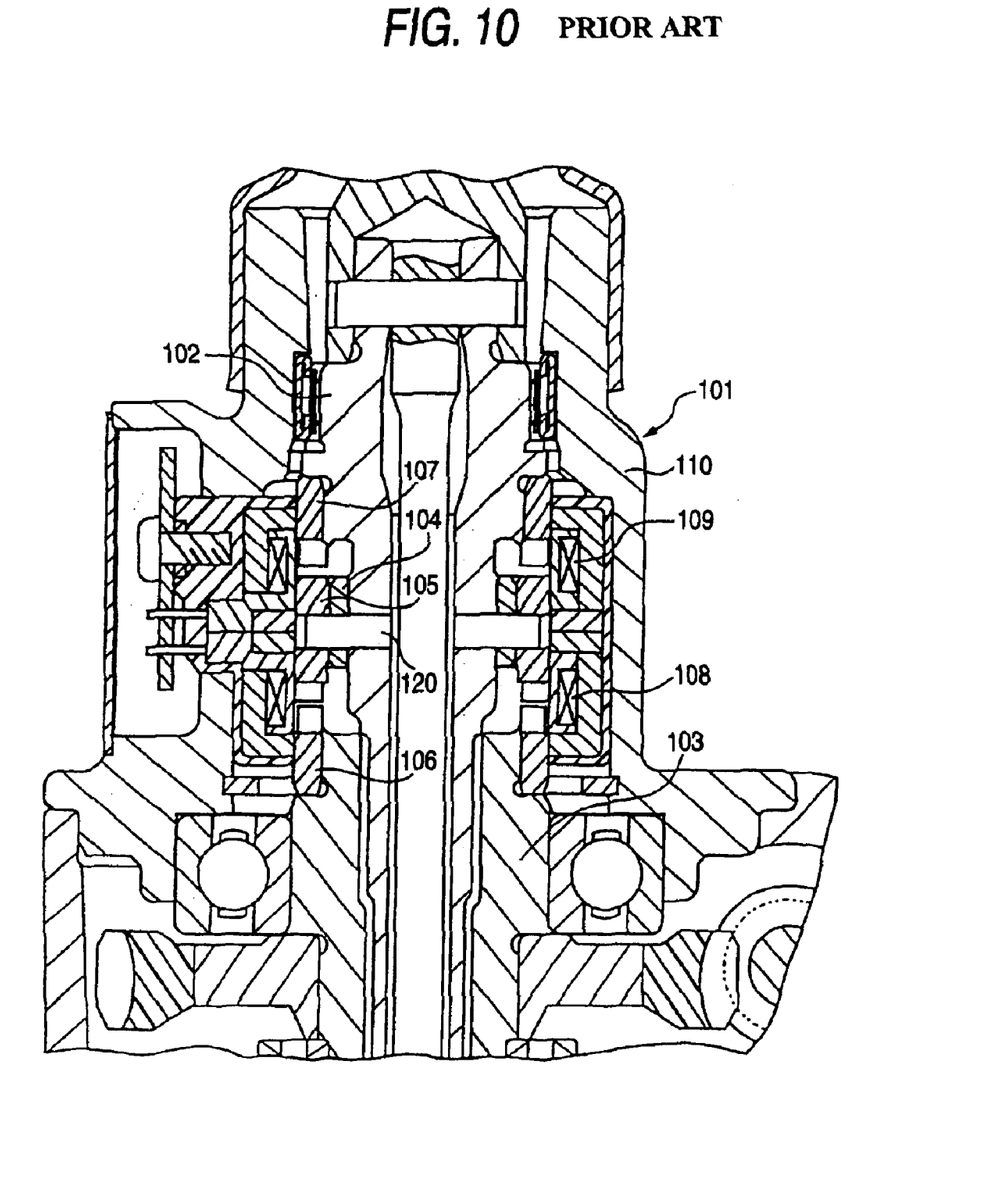
FIG. 10 is a vertical sectional view of a torque sensor of a prior art.

According to a torque sensor 101 of a related art shown in FIG. 10, a first shaft 102 made of a magnetic material is connected with a second shaft 103 elastically rotatably relative to each other. An outer periphery of the first shaft 102 is covered by a magnetism leakage preventing member 104 made of a nonmagnetic material and an outer periphery of the magnetism leakage preventing member 104 is covered by a first detecting cylinder 105 made of a magnetic material. The second shaft 103 is integrated with a second detecting cylinder 106 made of a magnetic material to rotate along therewith. The first shaft 102 is integrated with a third detecting cylinder 107 made of a magnetic material to rotate along therewith. One end of the first detecting cylinder 105 and one end of the second detecting cylinder 106 are opposed to each other with a clearance therebetween and other end of the first detecting cylinder 105 and the third detecting cylinder 107 are opposed to each other with a clearance therebetween. A first coil 108 constituting a first magnetic circuit by generating a magnetic flux passing the one end of the first detecting cylinder 105 and the one end of the second detecting cylinder 106 and a second coil 109 constituting a second magnetic circuit by generating a magnetic flux passing the other end of the first detecting cylinder 105 and one end of the third detecting cylinder 107 are held by a housing 110. The one end of the first detecting cylinder 105, the one end of the second detecting cylinder 106 and the one end of the third detecting cylinder 107 are constituted by pluralities of teeth aligned along a circumferential direction and the other end of the first detecting cylinder 105 is constituted by a flat face. Thereby, a reluctance with respect to the passing magnetic flux in the first magnetic circuit is changed in accordance with an elastic relative rotational amount between the two shafts 102 and 103 and a magnetic resistance with respect to the passing magnetic flux in the second magnetic circuit is made to remain unchanged in accordance with the elastic relative rotational amount between the two shafts 102 and 103. The change in the reluctance with respect to the passing magnetic flux in the first magnetic circuit is changed in accordance with the elastic relative rotational amount between the two shafts 102 and 103 and therefore, the change corresponds to a torque transmitted by the two shafts 102 and 103. The change in the reluctance with respect to the passing magnetic flux in the second magnetic circuit corresponds to a variation in temperature. Thereby, a variation in temperature of a detected torque can be compensated for by calculating the torque transmitted by the two shafts 102 and 103 based on a deviation between a value in correspondence with a change in the reluctance with respect to the passing magnetic flux in the first magnetic circuit and a value in correspondence with a change in the reluctance with respect to the passing magnetic flux in the second magnetic circuit.

In the related art, according to the torque sensor 101 of a type of preventing detection accuracy from being deteriorated by preventing magnetism leakage from the first detecting cylinder 105 to the first shaft 102 by the magnetism leakage preventing member 104 as described above, the magnetism leakage preventing member 104 is fitted together with the first shaft 102, the first detecting cylinder 105 is fitted together with the magnetism leakage preventing member 104 and the first detecting cylinder 105 and the magnetism leakage preventing member 104 are integrated to the first shaft 102 by a pin 120 (refer to JP-UM-A-3-48740).

According to the above-described torque sensor 101 of the related art, finishing of an inner periphery of the first detecting cylinder 105, working of forming pin holes to the first detecting cylinder 105, the magnetism leakage preventing member 104 and the first shaft 102 and press-fitting of the pin 120 into the pin holes are needed to thereby cause to increase working cost and integrating cost.

Further, in order to restrain a variation in temperature of the detected torque, it is necessary to control the clearance between the one end of the first detecting cylinder 105 and the one end of the second detecting cylinder 106 and the clearance between the other end of the first detecting cylinder 105 and the one end of the third detecting cylinder 107 with high accuracy. Therefore, working cost and integrating cost of the first detecting cylinder 105 and the magnetism leakage preventing member 104 are caused to increase.

SUMMARY OF THE INVENTION

It is an object of the invention to provide a torque sensor capable of resolving the above-described problem and a method of manufacturing the torque sensor.

In order to solve the aforesaid object, the invention is characterized by having the following arrangement.

(1) A torque sensor comprising:
  a first magnetic shaft;
  a second shaft elastically rotatably connected to the first shaft;
  a nonmagnetic cylindrical magnetism leakage preventing member made of synthetic resin covering an outer periphery of the first shaft;
  a magnetic first detecting cylinder covering an outer periphery of the magnetism leakage preventing member;
  a magnetic second detecting cylinder integrally rotatable with the second shaft, one end of which is opposed to one end of the first detecting cylinder with a clearance; and
  a first coil constituting a first magnetic circuit by generating magnetic flux passing the one end of the first detecting cylinder and the one end of the second detecting cylinder,
  wherein a reluctance with respect to the passing magnetic flux in the first magnetic circuit is changed in accordance with an elastic relative rotational amount by a change in a transmitting torque of the first and second shafts,
  wherein the magnetism leakage preventing member is molded in a state that the first shaft is inserted into the first detecting cylinder, so that the first detecting cylinder and the first shaft are integrated to the magnetism leakage preventing member.

(2) The torque sensor according to (1) further comprising:
  a magnetic third detecting cylinder integrally rotatable with the first shaft, one end of which is opposed to other end of the first detecting cylinder with a clearance; and
  a second coil constituting a second magnetic circuit by generating magnetic flux passing the other end of the first detecting cylinder and the one end of the third detecting cylinder,
  wherein the torque transmitted by the first and second shafts is detected based on a deviation between a value in correspondence with a change in the reluctance with respect to the passing magnetic flux in the first magnetic circuit and a value in correspondence with a change in the reluctance with respect to the passing magnetic flux in the second magnetic circuit, and wherein the magnetism leakage preventing member is molded in a state that the first shaft is inserted into the first detecting cylinder and the third detecting cylinder, so that the first detecting cylinder, the third detecting cylinder and the first shaft are integrated to the magnetism leakage preventing member.

(3) The torque sensor according to (1), wherein the first shaft is provided with an axial direction displacement restricting portion for restricting a displacement of the magnetism leakage preventing member in a axial direction of the first shaft.

(4) The torque sensor according to (3), wherein the axial direction displacement restricting portion includes at least one circumferential groove provided at the outer periphery of the first shaft, and wherein the magnetism leakage preventing member includes at least one ring-shape projected portion for fitting with the at least one circumferential groove.

(5) The torque sensor according to (4), wherein a plurality of the circumferential grooves are provided at the outer periphery of the first shaft at intervals in the axial direction, and a plurality of the projected portions are provided at the magnetism leakage preventing member so as to correspond to the plurality of the circumferential grooves.

(6) The torque sensor according to (1), wherein the first shaft is provided with a circumferential direction displacement restricting portion for restricting a displacement of the magnetism leakage preventing member in a circumferential direction of the first shaft.

(7) The torque sensor according to (6), wherein the circumferential direction displacement restricting portion includes at least one axial groove provided at the outer periphery of the first shaft, and the magnetism leakage preventing member includes at least one axial projected streak for fitting with the at least one axial groove.

(8) The torque sensor according to (7), wherein a plurality of the axial grooves are provided at the outer periphery of the firs shaft at intervals in the circumferential direction, and a plurality of the axial projected streaks are provided at the magnetism leakage preventing member so as to corresponds to the plurality of the axial grooves.

(9) A method of manufacturing a torque sensor including: a first magnetic shaft; a second shaft elastically rotatably connected to the first shaft; a nonmagnetic cylindrical magnetism leakage preventing member made covering an outer periphery of the first shaft; a magnetic first detecting cylinder covering an outer periphery of the magnetism leakage preventing member; a magnetic second detecting cylinder integrally rotatable with the second shaft, one end of which is opposed to one end of the first detecting cylinder with a clearance; and a first coil constituting a magnetic circuit by generating magnetic flux passing the one end of the first detecting cylinder and the one end of the second detecting cylinder, wherein a reluctance with respect to the passing magnetic flux in the first magnetic circuit is changed in accordance with an elastic relative rotational amount by a change in a transmitting torque of the first and second shafts, the method comprising the steps of:

providing a molding die for molding the magnetism leakage preventing member;

inserting the first shaft and the first detecting cylinder into the molding die; and after the inserting step, injecting a synthetic resin into the molding die to mold the magnetism leakage preventing member, so that the first shaft and the first detecting cylinder are integrated to the magnetism leakage preventing member.

DETAILED DESCRIPTION OF PREFERRED EMBODIMENTS

Figure 1:
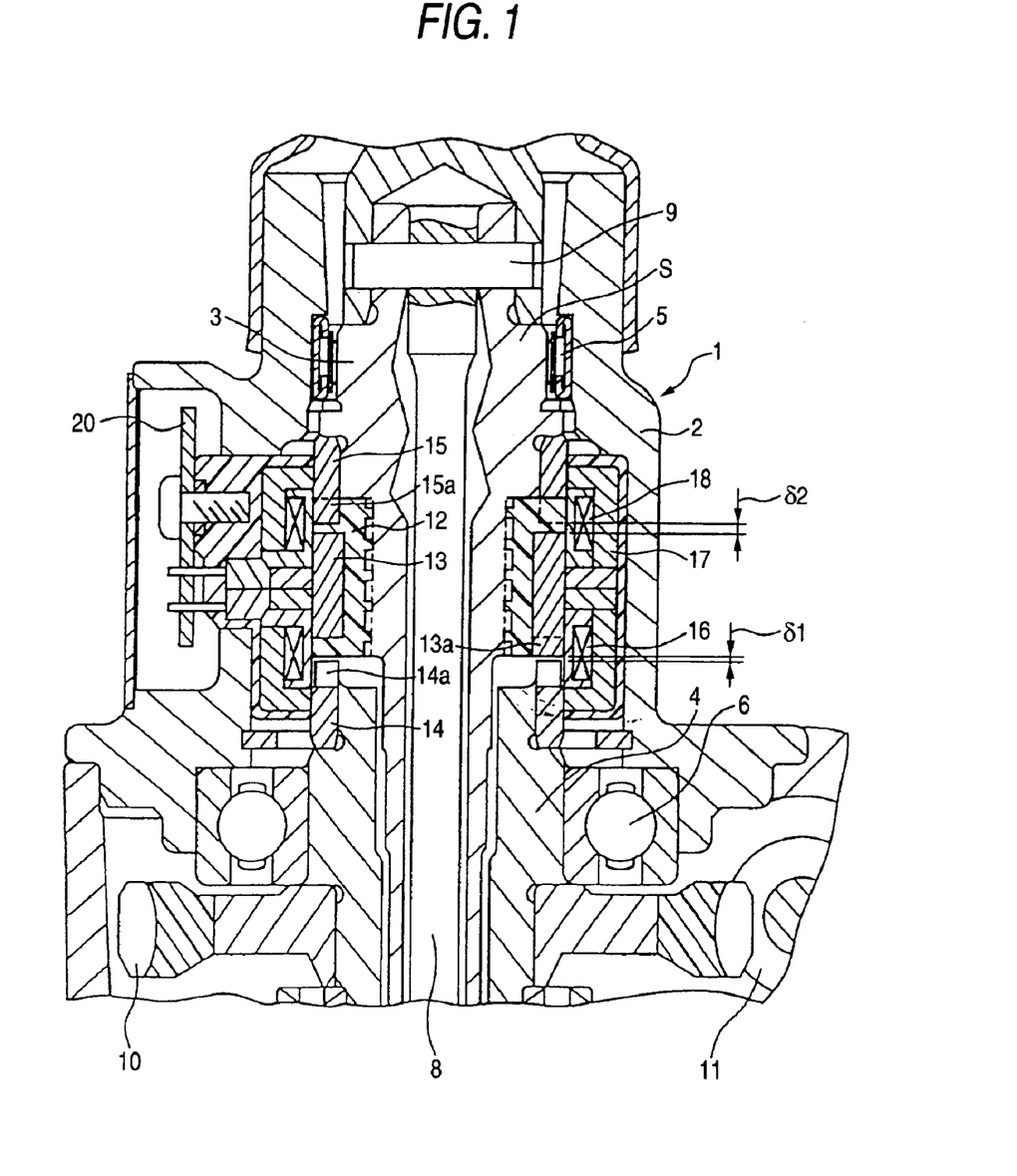
FIG. 1 is a vertical sectional view of a torque sensor according to an embodiment of the invention.

A torque sensor 1 shown in FIG. 1 is used in a power steering apparatus of a vehicle and includes a housing 2 and a torque transmitting shaft S for transmitting a steering torque and the torque transmitting shaft S includes a first shaft 3 made of a magnetic material and a second shaft 4 made of a magnetic material.

The first shaft 3 is rotatably supported by the housing 2 via a bearing 5 and connected to a steering wheel, not illustrated. The second shaft 4 is rotatably supported by the housing 2 via a bearing 6 and is connected to a wheel of a vehicle via a steering gear. One end side of a torsion bar 8 inserted into center holes of the first shaft 3 and the second shaft 4 is connected to the first shaft 3 by a pin 5 and other end side thereof is connected to the second shaft 4 by a pin or the like, not illustrated. Thereby, the second shaft 4 is connected to the first shaft 3 coaxially and elastically rotatably relative to each other. An outer periphery of the second shaft 4 is attached with a worm wheel 10 and a worm 11 in mesh with the worm wheel 10 is driven by a motor (not illustrated) for generating a steering assisting force attached to the housing 2.

An outer periphery of the first shaft 3 is covered by a cylindrical magnetism leakage preventing member 12 made of a nonmagnetic material. An outer periphery of the magnetism leakage preventing member 12 is covered by a first detecting cylinder 13 made of a magnetic material. An outer periphery of the second shaft 4 is integrated with a second detecting cylinder 14 made of a magnetic material to rotate along therewith by press-fitting. The outer periphery of the first shaft 3 is integrated with a third detecting cylinder 15 to rotate along therewith by press-fitting. One end of the first detecting cylinder 13 is arranged to be opposed to one end of the second detecting cylinder 14 with a clearance δ1 therebetween. Other end of the first detecting cylinder 13 is arranged to be opposed to one end of the third detecting cylinder 15 with a clearance δ2 therebetween. The one end of the first detecting cylinder 13, the one end of the second detecting cylinder 14 and the one end of the third detecting cylinder 15 are constituted by pluralities of teeth 13a, 14a and 15a aligned along a circumferential direction. The other end of the first detecting cylinder 13 is constituted by a flat face.

The magnetism leakage preventing member 12 is molded by injecting a synthetic resin material into a molding die. The first shaft 3 and the first detecting cylinder 13 are integrated to the magnetism leakage preventing member 12 to be molded to rotate along therewith by being inserted into the molding die before injecting the synthetic resin material. Further, the first shaft 3 is inserted into the molding die in a state of being connected to the third detecting cylinder 15.

Figure 2:
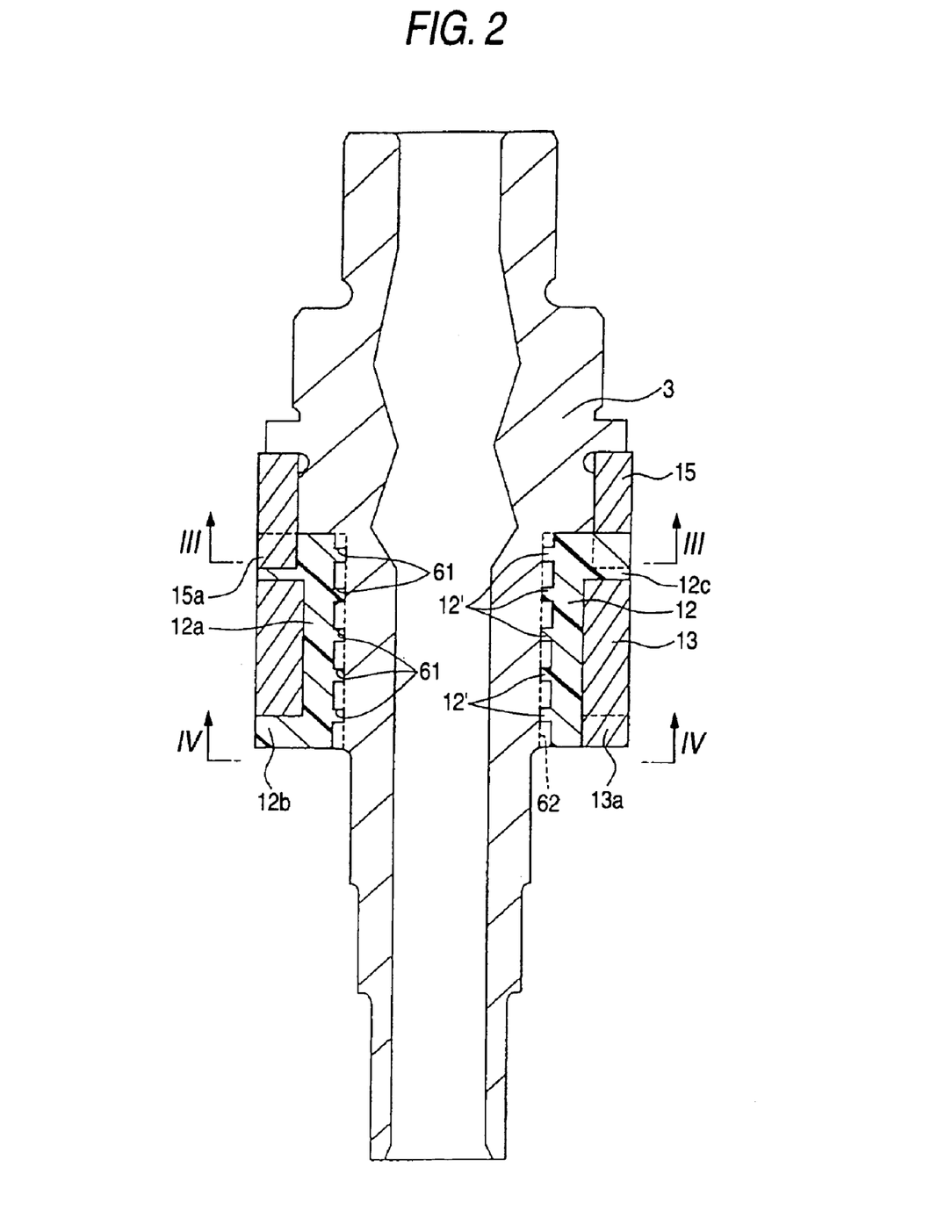
FIG. 2 is a vertical sectional view of a first shaft, a first detecting cylinder, a third detecting cylinder and a magnetism leakage preventing member in the torque sensor according to the embodiment of the invention.
Figure 3:
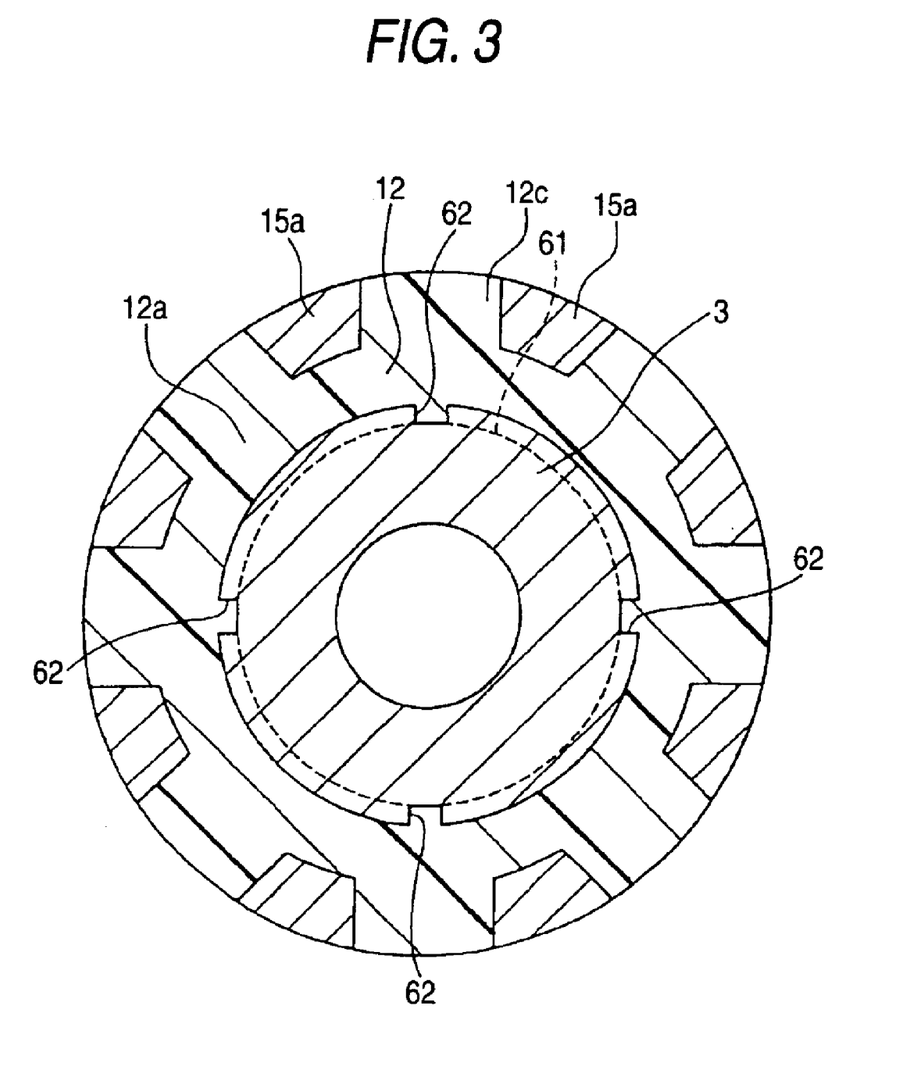
FIG. 3 is a sectional view taken along a line III—III of FIG. 2.
Figure 4:
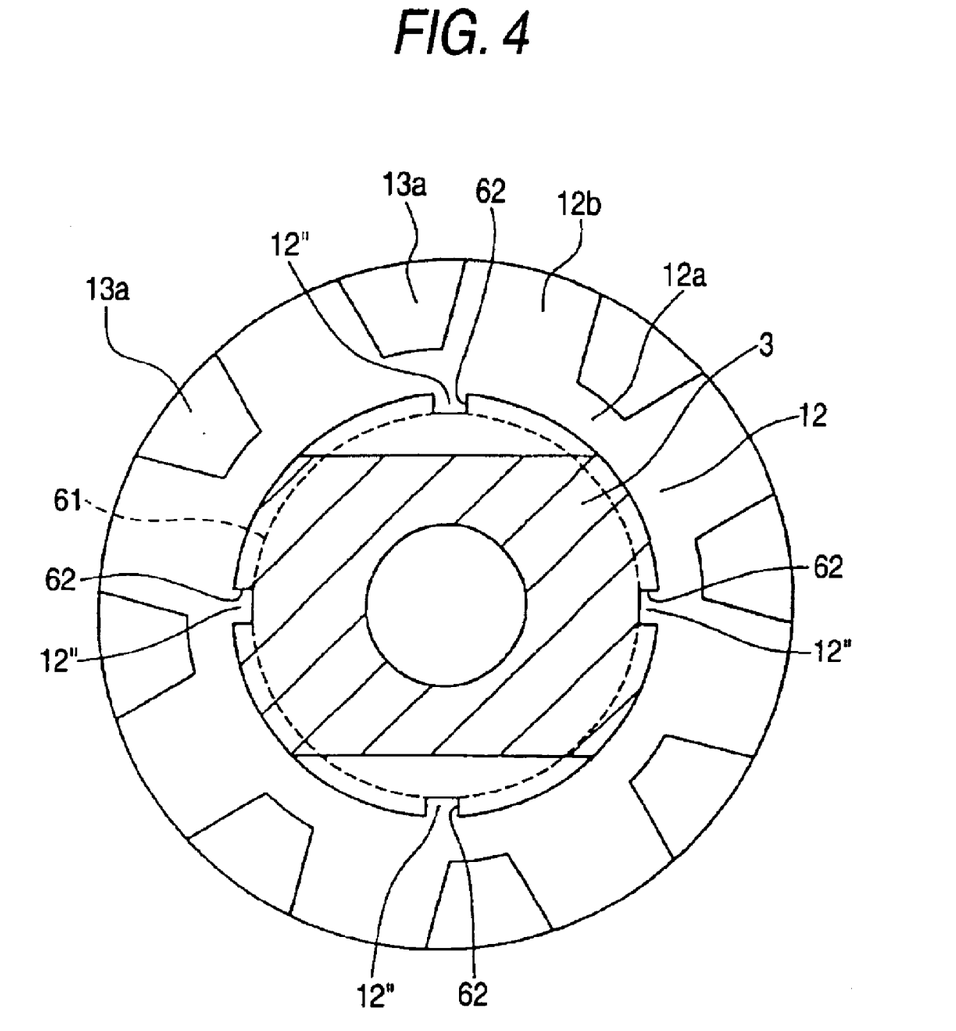
FIG. 4 is a sectional view taken along a line IV—IV of FIG. 2.

As shown by FIG. 2 through FIG. 4, the magnetism leakage preventing member 12 includes a cylindrical portion 12a, a first outer extended portion 12b extended from one end of the cylindrical portion 12a in an outer direction and a second outer extended portion 12c extended from other end of the cylindrical portion 12a in the outer direction. The first outer extended portion 12b is disposed at a region between the teeth 13a of the first detecting cylinder 13. The second outer extended portion 12c is disposed at a region between the other end of the first detecting cylinder 13 and the one end of the third detecting cylinder 15 and a region between the teeth 15a of the third detecting cylinder 15.

The outer periphery of the first shaft 3 is provided with a plurality of circumferential grooves 61 at intervals in an axial direction as axial direction displacement restricting portions for restricting displacement of the magnetism leakage preventing member 12 in a first shaft axial direction. The respective circumferential grooves 61 are fitted together with ring-like projected portions 12' at the inner periphery of the magnetism leakage preventing member 12. According to the embodiment, five pieces of the circumferential grooves 61 are constituted.

Further, the outer periphery of the first shaft 3 is provided with a plurality of axial direction grooves 62 at intervals in a circumferential direction as circumferential direction displacement restricting portions for restricting displacement of the magnetism leakage preventing member 12 in a first shaft circumferential direction. The respective axial direction grooves 62 are fitted together with projected streaks 12" at the inner periphery of the magnetism leakage preventing member 12. According to the embodiment, four pieces of the axial direction grooves 62 are constituted.

A first coil 16 and a second coil 18 covering the torque transmitting shaft S are contained in a holder 17 made of a magnetic material and held by the housing 2. A first magnetic circuit is constituted by generating a magnetic flux passing the one end of the first detecting cylinder 13 and the one end of the second detecting cylinder 14 by the first coil 16. A second magnetic circuit is constituted by generating a magnetic flux passing the other end of the first detecting cylinder 13 and the one end of the third detecting cylinder 15 by the second coil 18.

Figure 5:
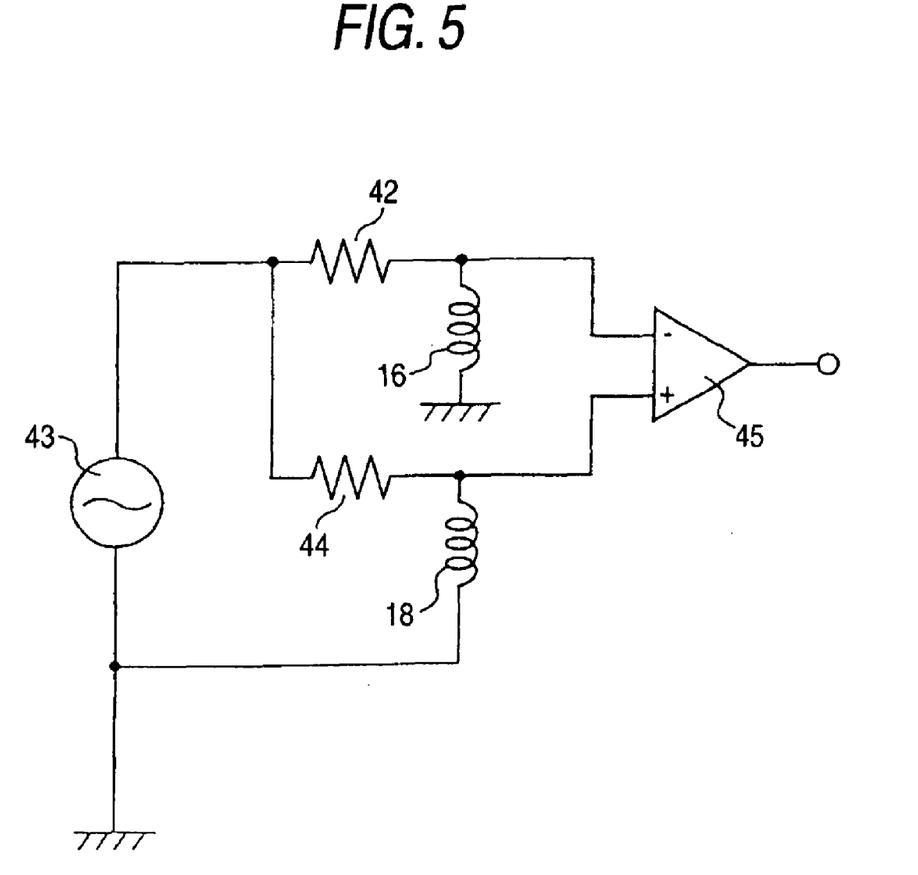
FIG. 5 is an explanatory view of a constitution of a detecting circuit in the torque sensor according to the embodiment of the invention.

A detecting circuit connected to the respective coils 16 and 18 is provided at a circuit board 20. FIG. 5 shows an example of the detecting circuit, the first coil 16 is connected to an oscillator 43 via a resistor 42 and the second coil 18 is connected to the oscillator 43 via a resistor 44. Further, the first coil 16 is connected to an inverted input terminal of an operational amplifier 45 and the second coil 18 is connected to a noninverted input terminal of the operational amplifier 45. In transmitting a torque by the two shafts 3 and 4, the torsion bar 8 is twisted in accordance with the torque and the first detecting cylinder 13 and the second detecting cylinder 14 are coaxially rotated relative to each other. By the relative rotation, an area of portions of the teeth 13a of the one end of the first detecting cylinder 13 and the teeth 14a of the one end of the second detecting cylinder 14 overlapped in the axial direction is changed and therefore, the reluctance with respect to the passing magnetic flux in the first magnetic circuit is changed in accordance with the elastic relative rotational amount of the two shafts 3 and 4 by a change in the torque. An output of the first coil 16 is changed in accordance with the change. The first detecting cylinder 13 is rotated along with the third detecting cylinder 15 and therefore the reluctance with respect to the passing magnetic flux in the second magnetic circuit is not varied by the change in the torque transmitted by the two shafts 3 and 4. The reluctance in the first magnetic circuit is made to be equal to the reluctance in the second magnetic circuit when the torque is not transmitted by the two shafts 3 and 4. Thereby, a signal of detecting the torque transmitted by the torque transmitting shaft S is generated by the detecting circuit based on the output of the first coil 16 by the change in the reluctance of the first magnetic circuit. Further, the reluctance in the second magnetic circuit in which the magnetic flux generated by the second coil 18 passes is not varied by the change in the torque transmitted by the torque transmitting shaft S and therefore, a variation in the output of the first coil 16 and a variation in the output of the second coil 18 by the variation in temperature are canceled by each other in the operational amplifier 45. That is, the torque transmitted by the two shafts 3 and 4 is detected based on a deviation between a value in correspondence with the change in the reluctance with respect to the passing magnetic flux in the first magnetic circuit and a value in correspondence with a change in the reluctance with respect to the passing magnetic flux in the second magnetic circuit, further, a variation in temperature of the detected torque is compensated for. A steering assisting force is exerted by driving the motor for generating the steering assisting force in accordance with the detected torque.

According to the above-described embodiment, the magnetism leakage preventing member 12 interposed between the first shaft 3 and the first detecting cylinder 13 is molded by injecting the synthetic resin material into the molding die inserted with the first shaft 3 and the first detecting cylinder 13 and therefore, the first shaft 3 and the first detecting cylinder 13 and the magnetism leakage preventing member 12 can be integrated without using a pin. Thereby, working of a pin hole, press-fitting of a pin and finishing of an inner periphery of the first detecting cylinder 13 are dispensed with.

Further, when the magnetism leakage preventing member 12 is thermally shrunk under a low temperature environment or in cooling at inside of the molding die or thermally expanded under a high temperature environment, the magnetism leakage preventing member 12 can be restricted from being displaced in the first shaft axial direction by the inner face of the circumferential groove 61 constituting the axial direction displacement restricting portion. Therefore, a variation in temperature of the detected torque can be restrained by preventing the clearance 51 between the one end of the first detecting cylinder 13 and the one end of the second detecting cylinder 14 and the clearance 62 between the other end of the first detecting cylinder 13 and the one end of the third detecting cylinder 15 from being varied to thereby set the two clearances δ1 and δ2 with high accuracy. By constituting a plurality of the circumferential grooves 61, both of thermal expansion and thermal shrinkage in the first shaft axial direction of the magnetism leakage preventing member 12 can be restrained among the circumferential grooves 61 and therefore, the variation in temperature of the respective clearances δ1 and δ2 can further effectively be restrained.

Further, the torque can be detected with high accuracy by restricting the displacement in the circumferential direction of the magnetism leakage preventing member 12 by the inner face of the axial direction groove 62 constituting the circumferential direction displacement restricting portion to thereby restrict the variation in the reluctance with respect to the passing magnetic flux in the first magnetic circuit. By constituting a plurality of the axial direction grooves 62, both of thermal expansion and thermal shrinkage in the first shaft circumferential direction of the magnetism leakage preventing member 12 can be restrained among the axial direction grooves 62 and therefore, the variation in the reluctance with respect to the passing magnetic flux in the first magnetic circuit can further effectively be restrained.

Figure 6:
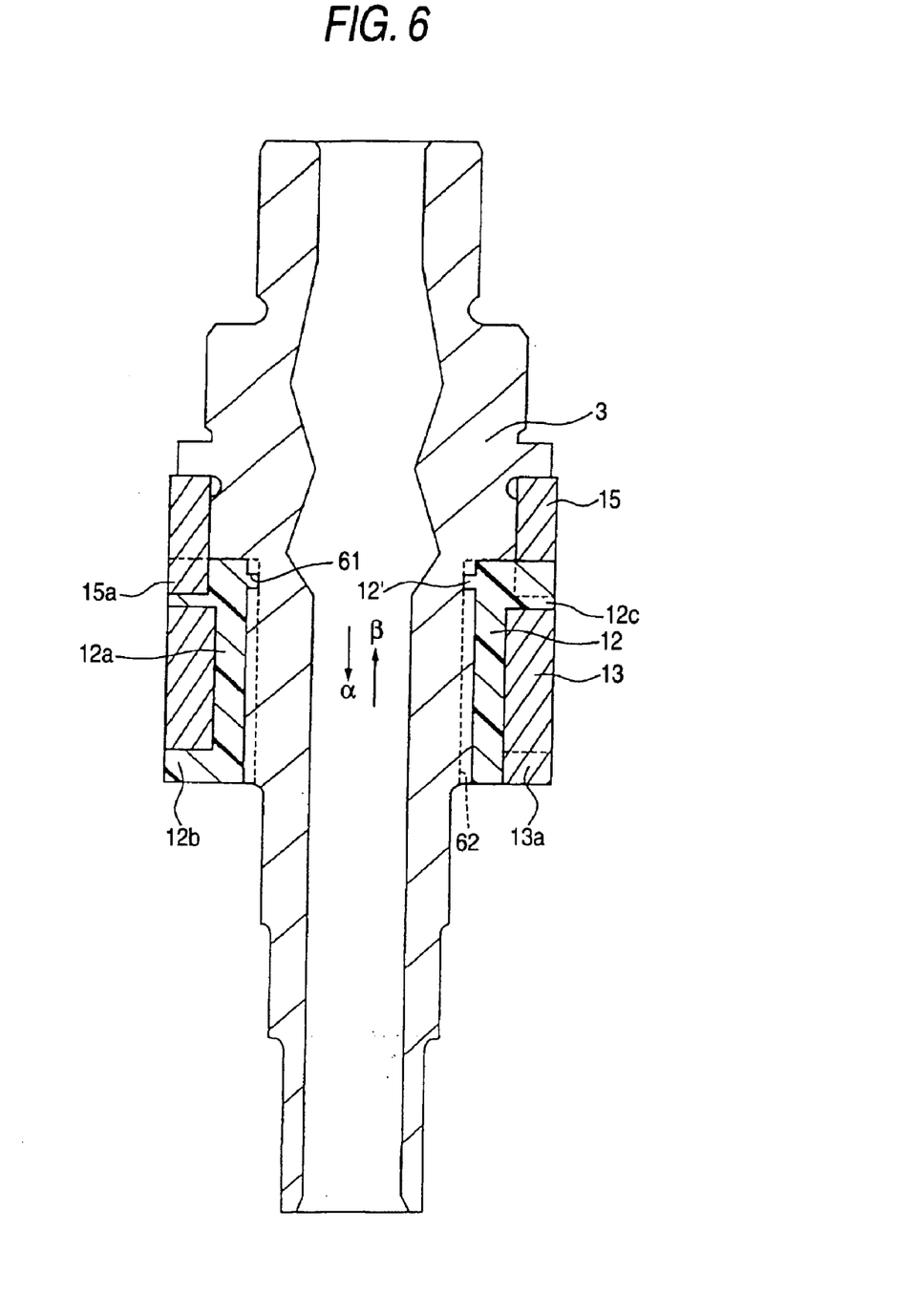
FIG. 6 is a vertical sectional view of a first shaft, a first detecting cylinder, a third detecting cylinder and a magnetism leakage preventing member according to a torque sensor of a first modified example of the invention.
Figure 7:
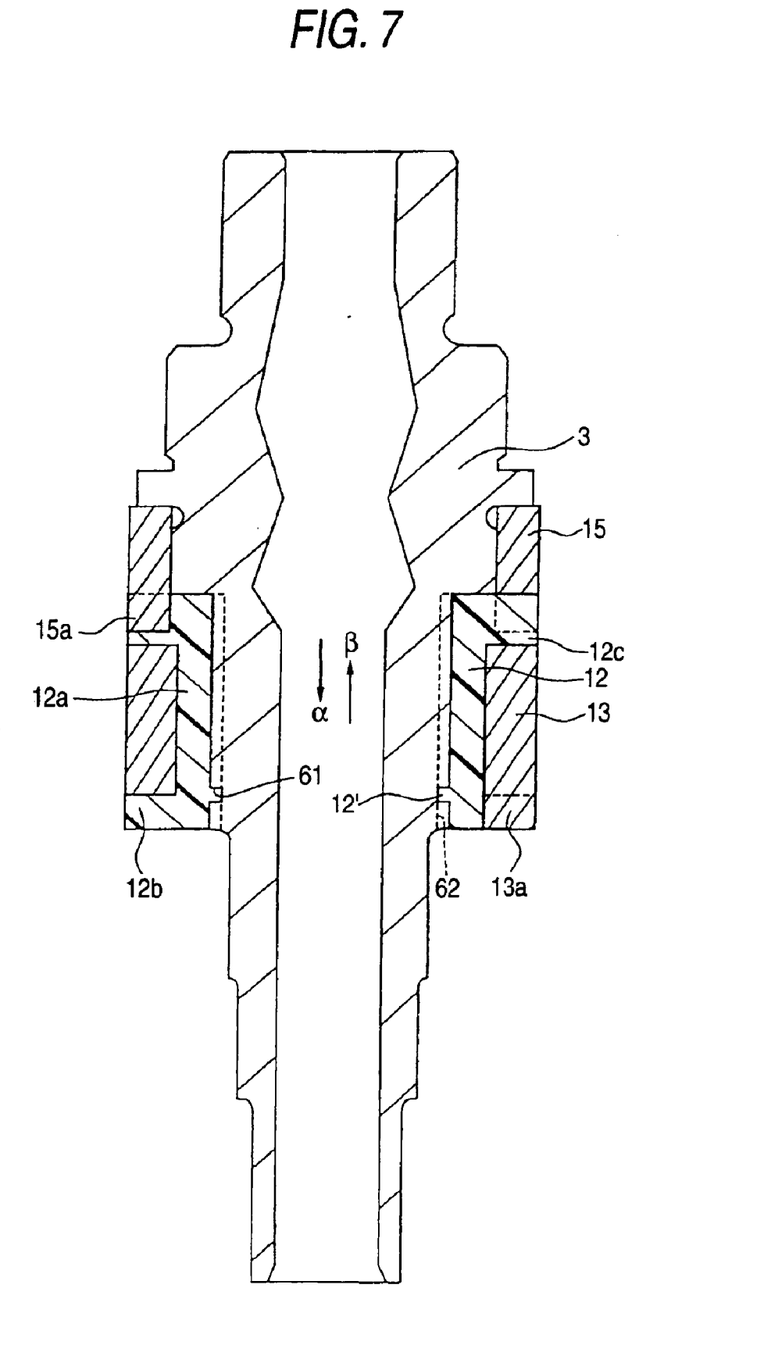
FIG. 7 is a vertical sectional view of a first shaft, a first detecting cylinder, a third detecting cylinder and a magnetism leakage preventing member according to a torque sensor of a second modified example of the invention.
Figure 8:
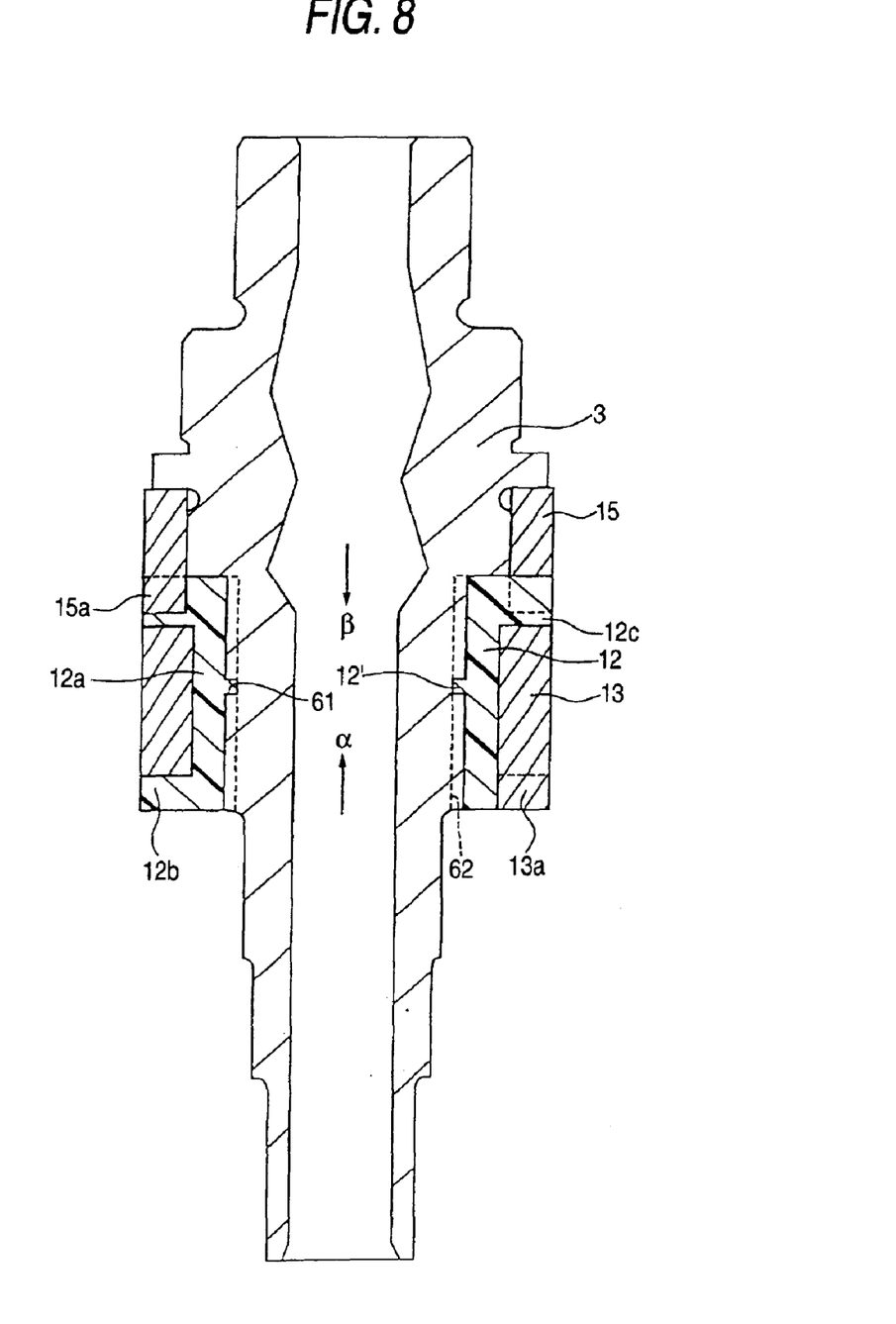
FIG. 8 is a vertical sectional view of a first shaft, a first detecting cylinder, a third detecting cylinder and a magnetism leakage preventing member according to a torque sensor of a third modified example of the invention.

The invention is not limited to the above-described embodiments. For example, a number of the circumferential grooves 61 is not particularly limited but the number may be single, however, the number is preferably plural, For example, when a single one of the circumferential groove 61 is constituted to arrange on an inner side of the third detecting cylinder 15 as shown by a first modified example of FIG. 6, the magnetism leakage preventing member 12 is restricted from being displaced in the axial direction in an arrow mark α direction by thermal shrinkage under a low temperature environment or in cooling at inside of the molding die by the inner face of the circumferential groove 61, further, the magnetism leakage preventing member 12 is restricted from being displaced in the axial direction in an arrow mark β direction by the end face of the third detecting cylinder 15 via the second outer extended portion 12c and therefore, the variations in the clearances 61 and 62 are reduced. When a single one of the circumferential groove 61 is constituted to arrange on an inner side of the teeth 13a of the first detecting cylinder 13 as shown by a second modified example of FIG. 7, the magnetism leakage preventing member 12 is restricted from being displaced in the axial direction in an arrow mark α direction by thermal expansion under a high temperature environment by the inner face of the circumferential groove 61, further, the magnetism leakage preventing member 12 is restricted from being displaced in the axial direction in an arrow mark β direction by the end face of the third detecting cylinder 15 via the second outer extended portion 12c and therefore, the variations in the clearances δ1 and δ2 are reduced. Therefore, in view of restricting the displacement by both of thermal shrinkage and thermal expansion of the magnetism leakage preventing member 12, it is further preferable to arrange the circumferential grooves 61 at two positions remote from each other in the axial direction of the first shaft 3. Further, when a single one of the circumferential groove 61 is constituted to arrange between two ends of the first detecting cylinder 13 as shown by a third modified example of FIG. 8, a displacement in an arrow mark α direction of a portion of the magnetism leakage preventing member 12 proximate to the second detecting cylinder 14 and a displacement thereof in an arrow mark β direction at a portion thereof proximate to the third detecting cylinder 15 by thermal shrinkage under a low temperature environment or in cooling at inside of the molding die are restricted by the inner faces of the circumferential groove 61, further, a displacement thereof in an arrow mark β direction of the portion proximate to the second detecting cylinder 14 and a displacement thereof in an arrow mark α direction of the portion proximate to the third detecting cylinder 15 are canceled by each other and therefore, the variations in the clearances δ1 and δ2 are reduced. Therefore, it is preferable to arrange the circumferential grooves 61 not only between the two positions remote from each other but also between the two ends of the first detecting cylinder 13 in the axial direction of the first shaft 3 and the larger the number, the more preferable in restricting the axial direction displacement of the magnetism leakage preventing member 12 by thermal shrinkage and thermal expansion. Whereas an output varying rate of the torque sensor 1 in the case of varying temperature in a range of −50° C. through 100° C. is about 10% when a single one of the circumferential groove 61 is constituted, the output varying rate becomes about 5% by constituting five pieces of the circumferential grooves 61. It is preferable to reduce a depth and a width of the circumferential groove 61 as small as possible within a range of being able to restrict the axial direction displacement of the magnetism leakage preventing member 12 in order to reduce influence of thermal deformation of the synthetic resin material at inside of the circumferential groove 61 and, for example, the depth is set to 0.2 mm through 2 mm and the width is set to 0.2 mm through 2 mm.

Also a number of the axial direction grooves 62 is not particularly limited but the number may be single, however, the number is preferably plural.

It is preferable to reduce a depth and a width of the axial direction groove 62 as small as possible within a range of being able to restrict the circumferential direction displacement of the magnetism leakage preventing member 12 in order to reduce influence of thermal deformation of the synthetic resin material at inside of the axial direction groove 62 and, for example, the depth is set to 0.2 mm through 2 mm and the width is set to 0.2 mm through 2 mm.

Figure 9:
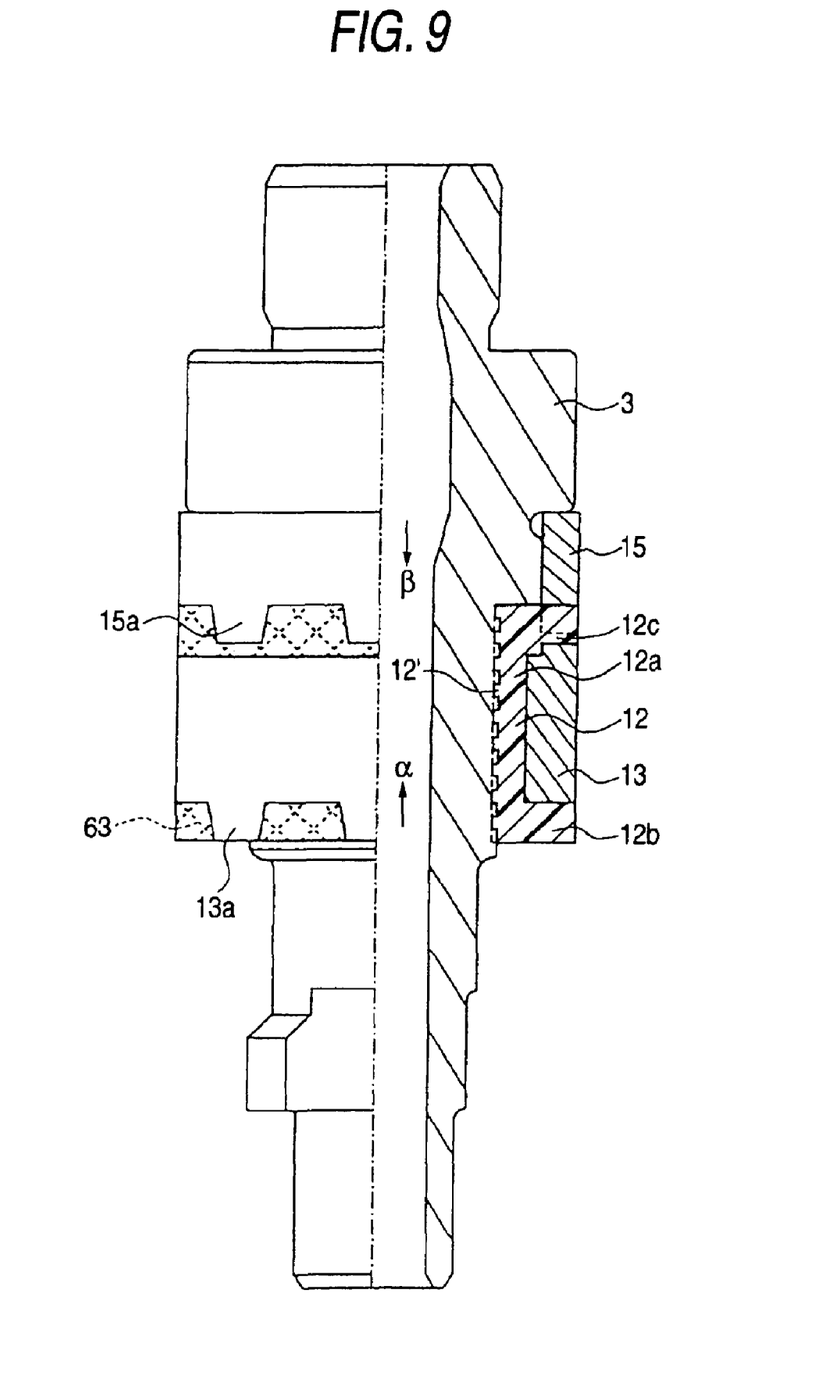
FIG. 9 is a partially broken side view of a first shaft, a first detecting cylinder, a third detecting cylinder and a magnetism leakage preventing member according to a torque sensor of a fourth modified example of the invention.

Further, as shown by a fourth modified example of FIG. 9, there may be provided a rollet 63 in a crisscross pattern at the outer periphery of the first shaft 3 in place of the circumferential groove 61 and the axial direction groove 62 as described above to serve both as the axial direction displacement restricting portion and the circumferential direction displacement restricting portion and a depth (height difference between ridge and valley) of the rollet 63 is set to, for example, 0.2 mm through 2 mm.

Further, when it is not necessary to compensate for the variation in temperature and detect the torque with high accuracy or when compensation of the variation in temperature and promotion of the accuracy of detecting torque are achieved by other means, the third detecting cylinder 15 is dispensed with and the axial direction displacement restricting portion and the circumferential direction displacement restricting portion are also dispensed with. Further, the torque sensor applied with the invention may be used for detecting a torque other than the steering torque.

According to the torque sensor of the invention, working cost and integrating cost can be reduced and the variation in temperature of the detected torque can be restrained.

What is claimed is:

1. A torque sensor comprising:
   a first magnetic shaft;
   a second shaft elastically rotatably connected to the first shaft;
   a nonmagnetic cylindrical magnetism leakage preventing member made of synthetic resin covering an outer periphery of the first shaft;
   a magnetic first detecting cylinder covering an outer periphery of the magnetism leakage preventing member;
   a magnetic second detecting cylinder integrally rotatable with the second shaft, one end of which is opposed to one end of the first detecting cylinder with a clearance; and
   a first coil constituting a first magnetic circuit by generating magnetic flux passing the one end of the first detecting cylinder and the one end of the second detecting cylinder, wherein a reluctance with respect to the passing magnetic flux in the first magnetic circuit is changed in accordance with an elastic relative rotational amount by a change in a transmitting torque of the first and second shafts,
   wherein the magnetism leakage preventing member is molded in a state that the first shaft is inserted into the first detecting cylinder, so that the first detecting cylinder and the first shaft are integrated to the magnetism leakage preventing member such that contact between the magnetism leakage preventing member and the first shaft prevents displacement of the magnetism leakage preventing member with respect to the first shaft in at least one of an axial direction and a circumferential direction.

2. The torque sensor according to claim 1, further comprising:
   a magnetic third detecting cylinder integrally rotatable with the first shaft, one end of which is opposed to other end of the first detecting cylinder with a clearance; and
   a second coil constituting a second magnetic circuit by generating magnetic flux passing the other end of the first detecting cylinder and the one end of the third detecting cylinder,
   wherein the torque transmitted by the first and second shafts is detected based on a deviation between a value in correspondence with a change in the reluctance with respect to the passing magnetic flux in the first magnetic circuit and a value in correspondence with a change in the reluctance with respect to the passing magnetic flux in the second magnetic circuit, and
   wherein the magnetism leakage preventing member is molded in a state that the first shaft is inserted into the first detecting cylinder and the third detecting cylinder, so that the first detecting cylinder, the third detecting cylinder and the first shaft are integrated to the magnetism leakage preventing member.

3. The torque sensor according to claim 1, wherein the first shaft comprises an axial direction displacement restricting portion for restricting a displacement of the magnetism leakage preventing member in an axial direction of the first shaft.

4. The torque sensor according to claim 3, wherein the axial direction displacement restricting portion comprises at least one circumferential groove at the outer periphery of the first shaft, and
   wherein the magnetism leakage preventing member comprises at least one ring-shape projected portion for fitting with the at least one circumferential groove.

5. The torque sensor according to claim 4, wherein the first shaft comprises a plurality of the circumferential grooves at the outer periphery of the first shaft at intervals in the axial direction, and the magnetism leakage preventing member comprises a plurality of the projected portions so as to correspond to the plurality of the circumferential grooves.

6. The torque sensor according to claim 1, wherein the first shaft comprises a circumferential direction displacement restricting portion for restricting a displacement of the magnetism leakage preventing member in a circumferential direction of the first shaft.

7. The torque sensor according to claim 6, wherein the circumferential direction displacement restricting portion comprises at least one axial groove at the outer periphery of the first shaft, and
   the magnetism leakage preventing member comprises at least one axial projected streak for fitting with the at least one axial groove.

8. The torque sensor according to claim 7, wherein said first shaft comprises a plurality of the axial grooves at the outer periphery of the first shaft at intervals in the circumferential direction, and said magnetism leakage preventing member comprises a plurality of the axial projected streaks so as to correspond to the plurality of the axial grooves.

9. A method of manufacturing a torque sensor including: a first magnetic shaft; a second shaft elastically rotatably connected to the first shaft; a nonmagnetic cylindrical magnetism leakage preventing member covering an outer periphery of the first shaft; a magnetic first detecting cylinder covering an outer periphery of the magnetism leakage preventing member; a magnetic second detecting cylinder integrally rotatable with the second shaft, one end of which is opposed to one end of the first detecting cylinder with a clearance; and a first coil constituting a magnetic circuit by generating magnetic flux passing the one end of the first detecting cylinder and the one end of the second detecting cylinder, wherein a reluctance with respect to the passing magnetic flux in the first magnetic circuit is changed in accordance with an elastic relative rotational amount by a change in a transmitting torque of the first and second shafts, the method comprising:
   providing a molding die for molding the magnetism leakage preventing member;
   inserting the first shaft and the first detecting cylinder into the molding die; and
   after the inserting step, injecting a synthetic resin into the molding die to mold the magnetism leakage preventing member, so that the first shaft and the first detecting cylinder are integrated to the magnetism leakage preventing member.

10. The torque sensor of claim 1, wherein the first shaft comprises at least one of:
    an axial direction displacement restricting portion that restricts a displacement of the magnetism leakage preventing member in an axial direction of the first shaft, and
    a circumferential direction displacement restricting portion that restricts a displacement of the magnetism leakage preventing member in a circumferential direction of the first shaft.

11. The method of claim 9, wherein contact between the magnetism leakage preventing member and the first shaft prevents displacement between the magnetism leakage preventing member relative to the first shaft in at least one of an axial direction and a circumferential direction.

12. The method of claim 9, wherein the first shaft comprises at least one of:
an axial direction displacement restricting portion that restricts a displacement of the magnetism leakage preventing member in an axial direction of the first shaft, and
a circumferential direction displacement restricting portion that restricts a displacement of the magnetism leakage preventing member in a circumferential direction of the first shaft.

* * * * *